April 17, 1956  E. E. HOOD  2,742,124
TWO-SPEED COASTER BRAKE FOR VELOCIPEDES AND THE LIKE
Filed Sept. 1, 1954  2 Sheets-Sheet 1

WITNESS:
Esther M. Stockton

INVENTOR.
Edwin Elliott Hood
BY
Clinton L. Janes
ATTORNEY

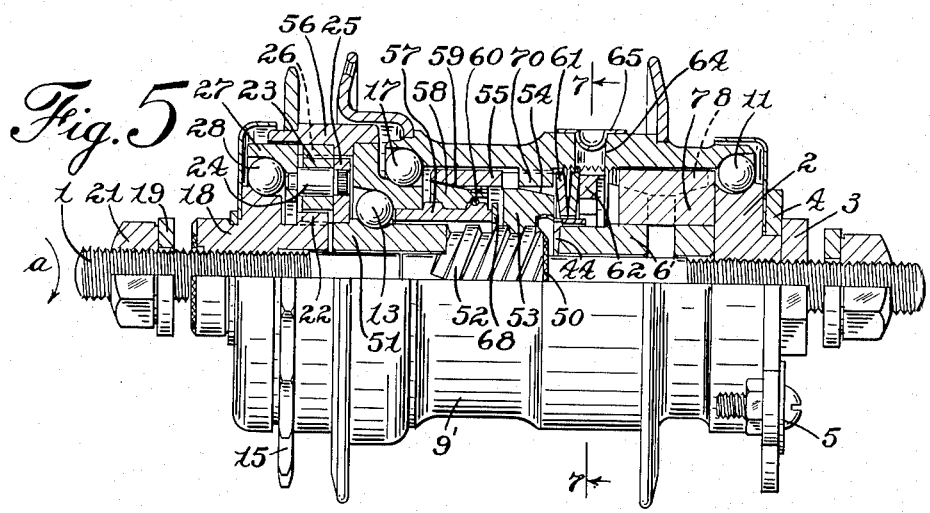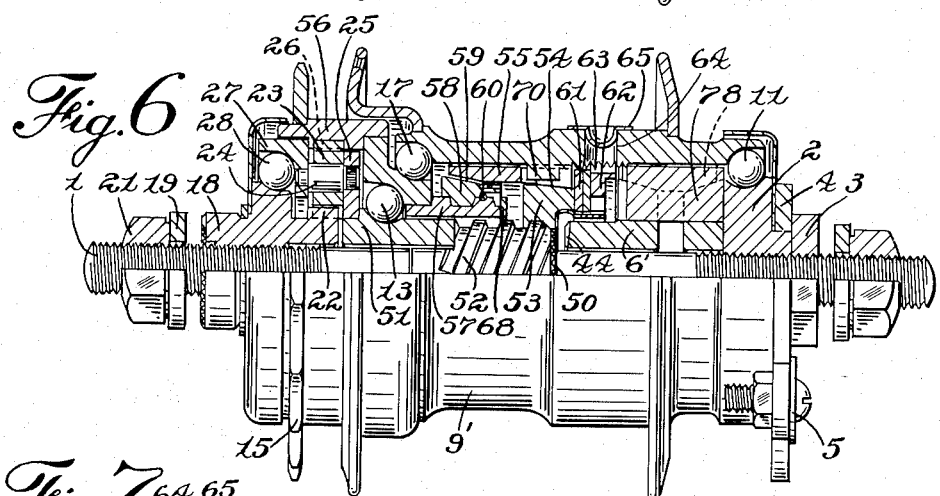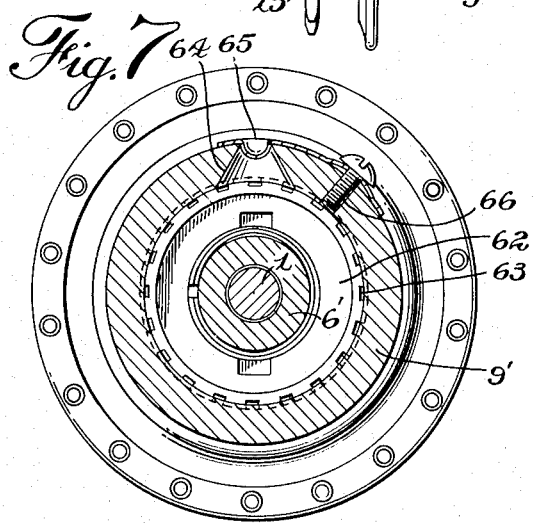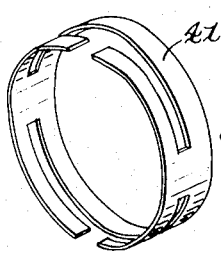

United States Patent Office 2,742,124
Patented Apr. 17, 1956

2,742,124

TWO-SPEED COASTER BRAKE FOR VELOCIPEDES AND THE LIKE

Edwin Elliott Hood, Elmira, N. Y., assignor to Bendix Aviation Corporation, a corporation of Delaware Application September 1, 1954, Serial No. 453,519

13 Claims. (Cl. 192—6)

The present invention relates to a load-controlled automatic two-speed coaster brake for velocipedes and the like, and in particular to a two-speed bicycle hub which is normally in high gear, but shifts to low gear when a predetermined driving torque is exceeded.

It is an object of the present invention to provide a novel device of the above character which is efficient and reliable in operation, sturdy in construction, and simple and economical to manufacture.

It is another object to provide such a device in which the shift from high gear to low gear takes place with very little slippage or lost motion.

It is another object to provide a device in which, when the low gear is in operation, the high-speed transmission is completely disengaged.

It is another object to provide such a device which having shifted to low gear, will stay in low gear as long as any substantial amount of torque is being transmitted, but will shift back into high gear smoothly and without lost motion as soon as the application of pedal pressure is relaxed.

It is a further object to provide such a device including means for conveniently regulating the amount of torque required to cause the device to shift into low gear.

Further objects and advantages will be apparent from the following description taken in connection with the accompanying drawings in which:

Fig. 4 is a detail in perspective of the retarder for the low-speed driving clutch member.

Fig. 5 is a view similar to Fig. 1 of a second embodiment of the invention in which the high-speed driving torque is externally adjustable;

Fig. 6 is a view similar to Fig. 5 showing the parts in low-speed position; and

Fig. 7 is a section taken substantially on the line 7—7 of Fig. 5.

Figure 1:
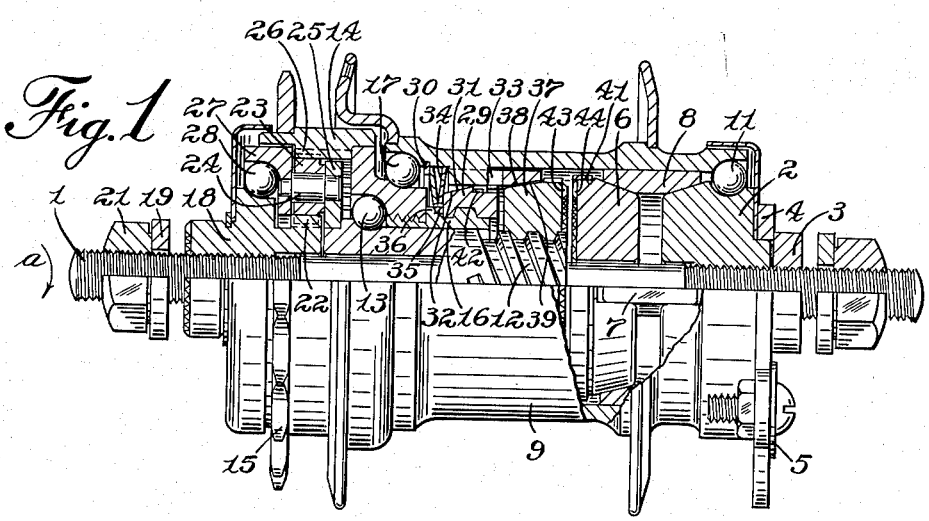
Fig. 1 is a side elevation, partly broken away and in section, showing a preferred embodiment of the invention with the parts in the positions occupied while the device is operating in high gear.

In Fig. 1 of the drawing there is illustrated a fixed axle 1 on which an anchor and brake expanding member 2 is adjustably fixed by means of a lock nut 3 which also serves to clamp thereon an anchor arm 4 having on the free end thereof a clip 5 for attachment to the frame of the vehicle. A second brake expander member 6 is slidably journalled on the axle 1 and has a splined connection with the anchor member 2 by means of a plurality of keys 7 slidably received therein. The two members 2 and 6 cooperate to expand a plurality of brake shoes 8 against the interior cylindrical surface of a hub member 9 one end of which is journalled on the anchor member 2 by means of bearings 11.

A screw shaft 12 is journalled on the axle 1 adjacent the expander member 6, and supports by means of a bearing 13 a driving member 14 having a sprocket 15 fixedly mounted on one end thereof, and having a threaded sleeve 16 rigidly attached thereto so as to form a part thereof. The driving member also serves as a support for the adjacent end of the hub 9 by virtue of a bearing 17.

Means for rotating the screw shaft 12 from the driving member at a reduced speed is provided comprising a torque-reaction member 18 which is adapted to be non-rotatably clamped to the frame of the vehicle by nuts 19 and 21 on the axle 1. Member 18 is provided with gear teeth forming a sun gear 22 adapted to mesh with a plurality of planetary pinions 23 rotatably mounted on studs 24. Said studs are fixed in uniformly spaced relation in a flange 25 rigidly attached to or formed integrally on the end of the screw shaft 12. The driving member 14 is provided with internal gear teeth 26 forming an orbit gear meshing with the planets 23 whereby rotation of the driving member 14 by the sprocket 15 causes the screw shaft 12 to be rotated in the same direction at a lower speed.

The free ends of the studs 24 are piloted in a ring member 27 rotatably mounted on the torque member 18 by means of bearing 28, and forming a support for the driving member 14 adjacent the attachment of sprocket 15.

Figure 3:
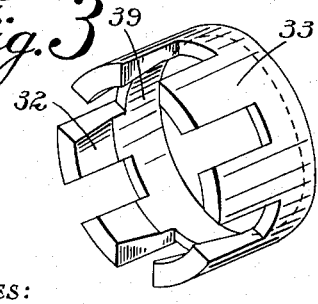
Fig. 3 is a detail in perspective of the shiftable driven clutch thimble.

Primary means for rotating the hub from the driving member is provided comprising a high-speed driving clutch member 29 threaded on the sleeve 16 of the driving member, and formed with a conical clutch surface 31 adapted to cooperate with a similar clutch surface 32 on a driven clutch thimble 33 (Fig. 3) which is splined to the interior of the hub. The pitch of the threads on sleeve 16 and high-speed driving clutch member 29 is such that forward rotation of the driving member in the direction of the arrow (a) in Fig. 1 traverses the driving clutch member to the left in Fig. 1 into frictional engagement with the driven clutch thimble 33. Corresponding longitudinal movement of the driven clutch member is yieldingly resisted by a compression spring 34 which is here shown in the form of a plurality of dished spring washers bearing against a thrust ring 30 seated in the interior of the hub 9. The engaging movement of the high-speed driving clutch member 29 is positively limited by a thrust ring 35 seated against a shoulder 36 on the screw shaft so that slippage of said clutch members will take place when a predetermined driving torque is exceeded, the point of slippage being determined by the stiffness of the spring 34.

Secondary means for rotating the hub from the driving member 14 is provided comprising a low-speed driving clutch member 37 threaded on the screw shaft 12, and provided with a conical clutch surface 38 adapted to cooperate with a similar clutch surface 39 in the interior of the driven clutch thimble 33. The threads of the screw shaft and low-speed driving clutch member are of the same hand but of lower pitch than the threads of the sleeve 16 and high-speed driving clutch member 29, so that forward rotation of the screw shaft 12 by the driving member 14 tends to cause engagement of the low-speed driving clutch member, but if the high-speed clutch is in effective operation, the driven clutch thimble 33 will be rotating faster than the low-speed driving clutch member 37, whereby contact of the low-speed clutch surfaces causes the low-speed clutch member to move back on the screw shaft 12 out of engagement with the driven clutch thimble.

Means are provided for insuring traversal of the driving clutch members responsive to rotation of the elements on which they are threaded. For this purpose the low-speed driving clutch element 37 is frictionally connected to the expander member 6 by means of a split drag ring 41 (Fig.

4) fixed on the expander member and having an arm bearing frictionally on said clutch member. A similar function is performed for the high-speed clutch member by means of a spring element 42 mounted thereon and bearing frictionally on the interior of the driven clutch thimble.

Figure 2:
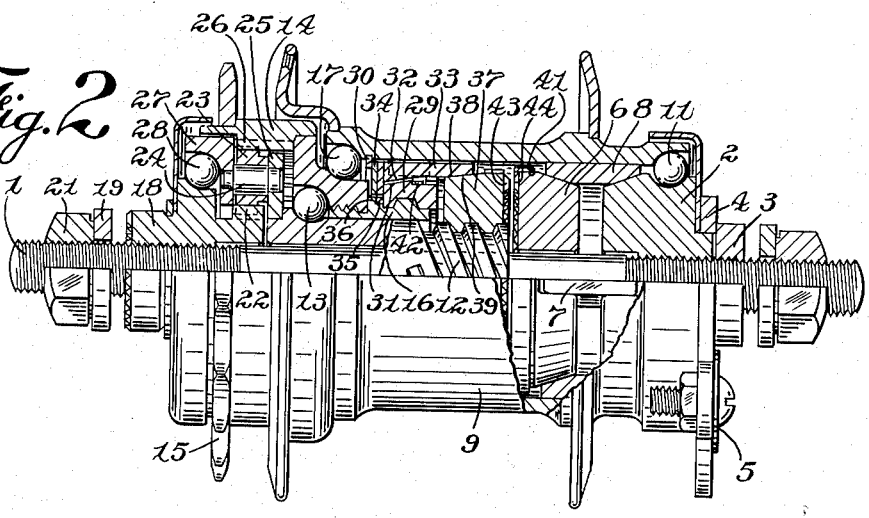
Fig. 2 is a similar view showing the parts in low gear operating position.

In operation, starting with the parts in the positions illustrated in Fig. 1, forward rotation of the sprocket 15 by the operator is transmitted directly to the driving member 14 including its threaded sleeve 16 which causes longitudinal movement of the high-speed driving clutch member 29 to the left, forcing it into frictional engagement with the driven clutch thimble which is accordingly moved to the left against the resistance of spring 34 while clutching pressure is built up between the members 29 and 33. Rotation is thereby transmitted directly to the hub 9 to propel the vehicle. Should unusual resistance be encountered as in climbing a hill, added exertion by the operator causes the high-speed driving clutch member 29 to move further to the left until its travel on the sleeve 16 is stopped by the thrust ring 35. If the torque capacity of the clutch connection between members 29, 33 as determined by the resistance of the spring 34 is then exceeded, slippage of the high-speed clutch will take place, which permits the screw shaft 12 to be accelerated through its gearing connection to the driving member 14 until it is rotating faster than the hub 9. Under these circumstances, the low-speed driving clutch member 37 is forced into engagement with the driven clutch thimble 33 by the screw-jack action of the screw shaft, and since the pitch of the threads on the screw shaft is comparatively low as above stated, this longitudinal pressure is effective to move the driven clutch thimble still further to the left toward the position shown in Fig. 2 where the spring 34 is compressed solid, and the driven clutch thimble 33 is moved completely out of contact with the high-speed driving clutch member 29. Thereafter the hub 9 is rotated through the planetary reduction gearing 26, 23, 22, the screw shaft 12 and low-speed clutch 37, 33.

During the time that the high-speed clutch is slipping while still in frictional contact, torque is transmitted to the hub simultaneously through both the high gear and the low gear connections; while the driving member 14, and consequently the pedals of the operator, rotate at some speed intermediate the high gear and the low gear rates. It has thus been found possible, by controlling the pedal pressure, to secure conditions of operation resembling variable gear ratios intermediate high gear and low gear.

Inasmuch as the pitch angle of the threads on the screw shaft 12 is low, and the low-speed clutch surfaces are narrowly tapered, the parts will remain in their low gear driving positions as long as any substantial torque is being transmitted therethrough.

When the operator relaxes his propulsive effort, as after having surmounted the hill or other obstruction, the spring 34 is thereby permitted to expand and move the driven clutch member 33 together with the low-speed driving clutch member 37 to the right until the high-speed driving clutch element 29 reengages the driven clutch member. When this occurs, the low-speed driving clutch element 37 is disengaged by the overrunning of the hub 9, and propulsion through the high-speed connection is resumed.

When it is desired to apply the brake, backward rotation of the driving member 14 by the operator moves the low-speed driving clutch member 37 further to the right in Fig. 1 until it engages the expander member 6 whereupon rotation of said clutch member is positively prevented by the inter-engaging dental projections 43 and 44 on the clutch member end and expander member respectively. Backward pressure by the operator then causes the expander member 6 to be forced to the right, moving the brake shoes 8 into frictional engagement with the interior of the hub 9 to retard the vehicle.

In Figs. 5 to 7 of the drawing there is illustrated an embodiment of the invention in which the pressure of the high-speed clutch spring is conveniently adjustable to regulate the torque required to cause the device to shift down to low gear. In this embodiment, the brake elements and the gearing elements are the same as in the embodiment first described. However, the direction of movement of the clutch members is reversed, and the brake is applied by a longitudinally movable section of the screw shaft.

For this purpose the low-speed driving means corresponding to the screw shaft 12 and flange 25 of Fig. 1 is formed in two parts, namely a planet carrier 51 and a screw shaft 52 which is slidably but non-rotatably connected therewith as by means of interengaging jaw projections and has dentals 50 on its free end adapted to engage the dentals 44 of the brake expander member 6. Screw shaft 52 is of opposite hand to the screw shaft 12 of the first embodiment, and has mounted thereon a low-speed driving clutch element 53 which is formed to engage a corresponding clutch surface 54 on the driven clutch thimble 55 splined in the vehicle hub 9' by means of splines 70. The driving member 56 is similar to the driving member 14 of the first embodiment except that the threaded sleeve 57 is of opposite hand to the sleeve 16. A high-speed driving clutch member 58 is threaded on the sleeve 57 and is movable thereon into engagement with the high-speed clutch surface 59 of the driven clutch thimble 55 such movement being limited by a stop ring 60 on the sleeve.

Longitudinal movement of the driven clutch thimble to the right is resisted by a compression spring 61 which bears against an abutment ring 62 threaded in the hub 9'. In order to provide for rotary adjustment of this abutment ring to vary the pressure of the spring 61, the periphery of said ring is formed with spaced notches 63 (Fig. 7) and an opening 64 through the hub is arranged to permit the insertion of a suitable tool such as a drift or punch whereby the abutment ring can be rotated. The opening 64 is preferably closed by an elastic flap 65 which is retained on the hub by suitable means such as a stud 66 extending through the hub into engagement with the periphery of the abutment ring, to thus serve also as a locking means to hold the ring in adjusted position. Expansion of the spring 61 is preferably limited by engagement with the ends of the splines 70 in the hub.

In the operation of this embodiment of the invention, forward rotation of the driving member 56 is transmitted directly to the threaded sleeve 57 which moves the high-speed driving clutch member 58 into operative engagement with the driven clutch member 55, the longitudinal movement of which is resisted by the spring 61. The longitudinal engaging movement of the high-speed driving clutch member 58 is limited by the stop ring 60, and when sufficient force is applied by the operator to cause slippage of the high-speed clutch 58, 55, the low-speed driving clutch member 53 becomes operative to transmit torque to the hub 9', at the same time moving the driven clutch member 55 out of engagement with the high-speed driving clutch member 58 as shown in Fig. 6. When the operator relaxes his pressure on the pedals of the vehicle, the spring 61 becomes effective to shift the parts back into high gear as above described.

The critical pressure at which the shift takes place from high gear to low gear may readily be adjusted to suit the preference of the operator by rotating the abutment ring 62 to relax or compress the spring 61 to secure the desired effect, after which the ring is retained in position by tightening the screw 66.

When it is desired to operate the brake, backward rotation of the driving member 56 by the operator causes the low-speed driving clutch member 53 to be traversed to the left on the screw shaft 52 until it encounters a thrust washer 68 bearing against the end of the threaded sleeve 57. Backward movement of the clutch member 53 is thereby arrested, and the screw shaft 52 is thus moved to the right by screw-jack action until the dentils 50 thereon engage the similar dentils 44 on the brake expander 6'. Further backward pressure by the operator then causes the brake to be applied in the usual manner.

Although but two embodiments of the invention have been shown and described in detail it will be understood that changes may be made in the design and arrangement of the parts without departing from the spirit of the invention.

I claim:

1. In a two-speed coaster brake, a fixed axle, a driving member rotatably mounted thereon, a wheel hub rotatably mounted on the axle, primary means for rotating the hub from the driving member including a primary clutch connection and means responsive to forward rotation of the driving member for closing the clutch; secondary means for rotating the hub from the driving member including speed-reducing gearing and a secondary self-tightening clutch; means for limiting the torque capacity of the primary clutch, and means responsive to slippage of the primary clutch for causing engagement of the secondary clutch.

2. A two-speed coaster brake as set forth in claim 1 including further, means actuated by engagement of the secondary clutch for disengaging the primary clutch.

3. A two-speed coaster brake as set forth in claim 1 in which the primary clutch connection includes a driven clutch member splined in the hub, a driving clutch member threaded on said driving member for movement into and out of engagement with the driven clutch member, and yielding means resisting longitudinal movement of the driven clutch member by the driving clutch member.

4. A two-speed coaster brake as set forth in claim 3 in which the secondary rotating means includes a low-speed screw shaft, and a low-speed driving clutch member threaded thereon for movement into and out of engagement with said driven clutch member.

5. A two-speed coaster brake as set forth in claim 4, said means for limiting the torque capacity of the primary clutch including means for positively limiting the engaging movement of the primary driving clutch member, the engaging movement of the low-speed driving clutch member being in the direction to move the driven clutch member out of contact with the primary driving clutch member.

6. A two-speed coaster brake as set forth in claim 4 including further braking means for resisting rotation of the hub, and means responsive to backward rotation of the driving member for energizing the braking means.

7. A two-speed coaster brake as set forth in claim 6 in which the means for energizing the braking means includes a longitudinally movable expander member located in position to be engaged and actuated by the low-speed driving clutch member responsive to backward rotation of the low-speed screw shaft.

8. In a two-speed coaster brake, a fixed axle, a wheel hub rotatably mounted thereon, a driven clutch thimble splined in the hub, high-speed driving means including a high-speed driving clutch member movable longitudinally into engagement with the driven clutch thimble, yielding means resisting longitudinal movement of the driven clutch thimble responsive to pressure of said driving clutch member, means for limiting the engaging movement of the driving clutch member; and low-speed driving means for the hub including a low-speed driving clutch member and means for moving the low-speed driving clutch member longitudinally to engage the driven clutch thimble and move it out of contact with the high-speed driving clutch member.

9. A two-speed coaster brake as set forth in claim 8 including further means for adjusting the pressure of said yielding means.

10. A two-speed coaster brake as set forth in claim 9 in which said adjusting means includes an abutment ring having a rotarily inclined connection to the hub.

11. A two-speed coaster brake as set forth in claim 10 including further means accessible from the exterior of the hub for rotarily adjusting said abutment ring and anchoring it in adjusted position.

12. In a two-speed load-controlled automatic hub drive for velocipedes and the like, a fixed axle, a wheel hub rotatably mounted thereon, a driven clutch member in the form of a hollow clutch thimble splined in the hub and formed with a high-speed clutch surface and a low-speed clutch surface, a driving member rotatably mounted in the hub having a threaded sleeve, a high-speed driving clutch member threaded on said sleeve for movement into engagement with the driven clutch thimble responsive to forward rotation of the sleeve, yielding means resisting longitudinal movement of the driven clutch thimble responsive to engagement by said driving clutch member; a screw shaft rotatably mounted on the axle, means for rotating the screw shaft from the driving member at reduced speed, and a low-speed driving clutch member threaded on the screw shaft for longitudinal movement in the same direction as the high-speed driving clutch member into engagement with the driven clutch thimble responsive to forward rotation of the screw shaft.

13. A two-speed drive as set forth in claim 12 in which the threads of the sleeve are of the same hand but of higher pitch than the screw shaft.

References Cited in the file of this patent

UNITED STATES PATENTS

| 942,520 | Rockwell | Dec. 7, 1909 |
| 2,600,586 | Spencer | June 17, 1952 |